Feb. 17, 1942.    W. AAB    2,273,683
VALVE SEAT REFACING TOOL
Filed Aug. 26, 1940    3 Sheets-Sheet 3
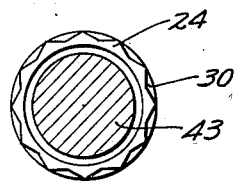
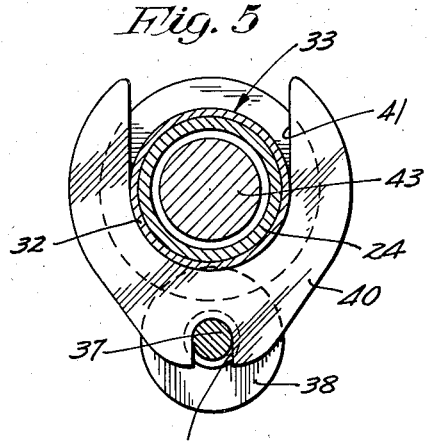
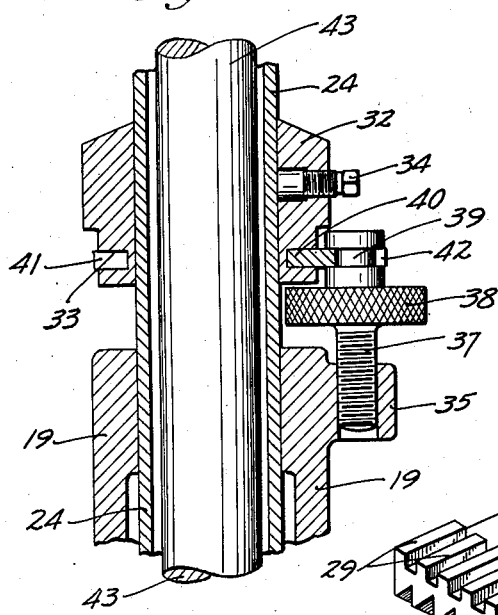
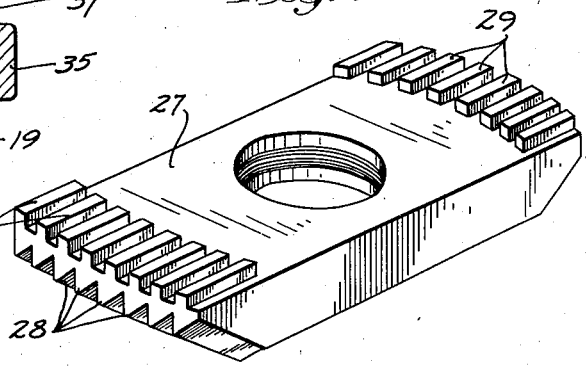
Inventor
William Aab
By his Attorneys
Merchant & Merchant Patented Feb. 17, 1942

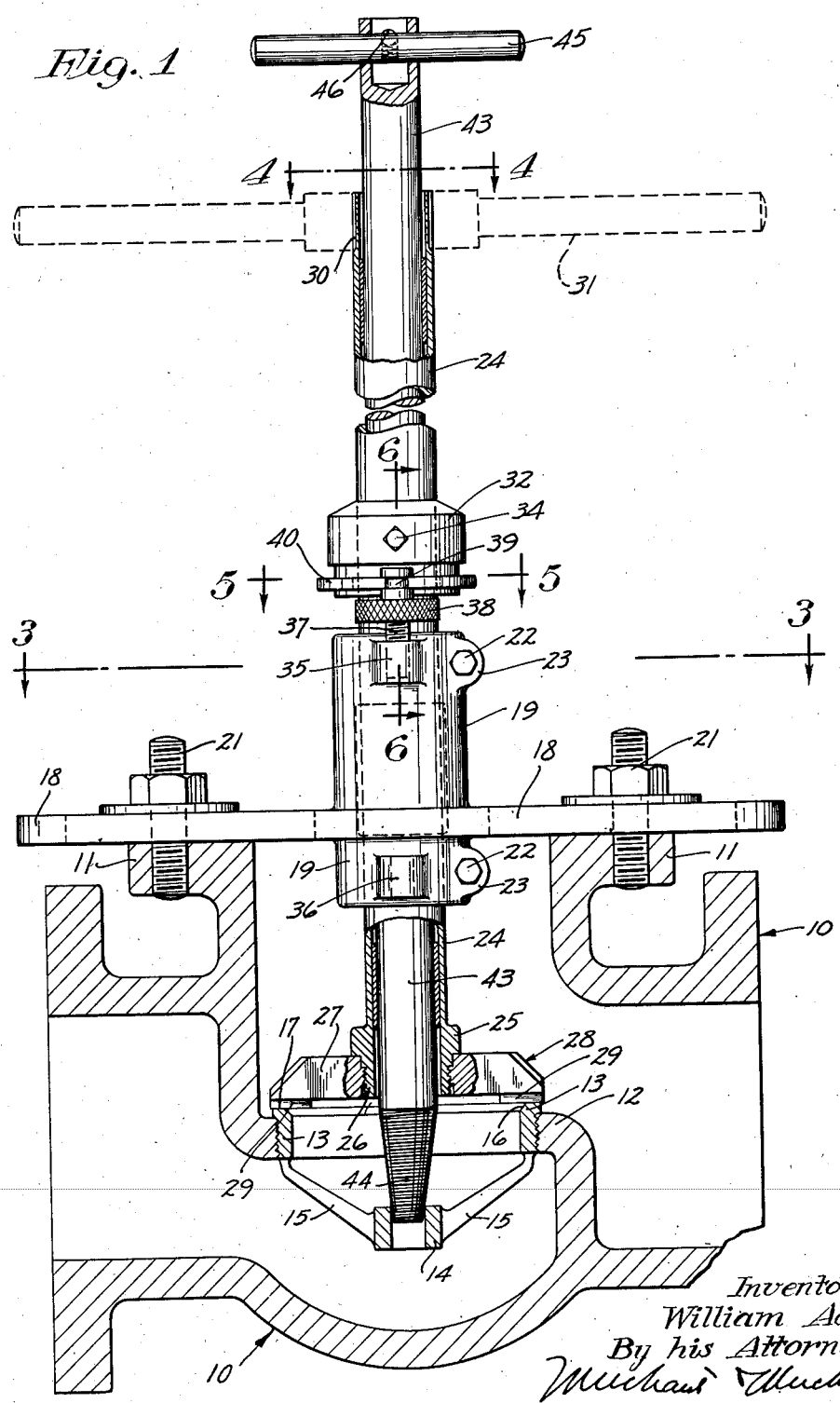

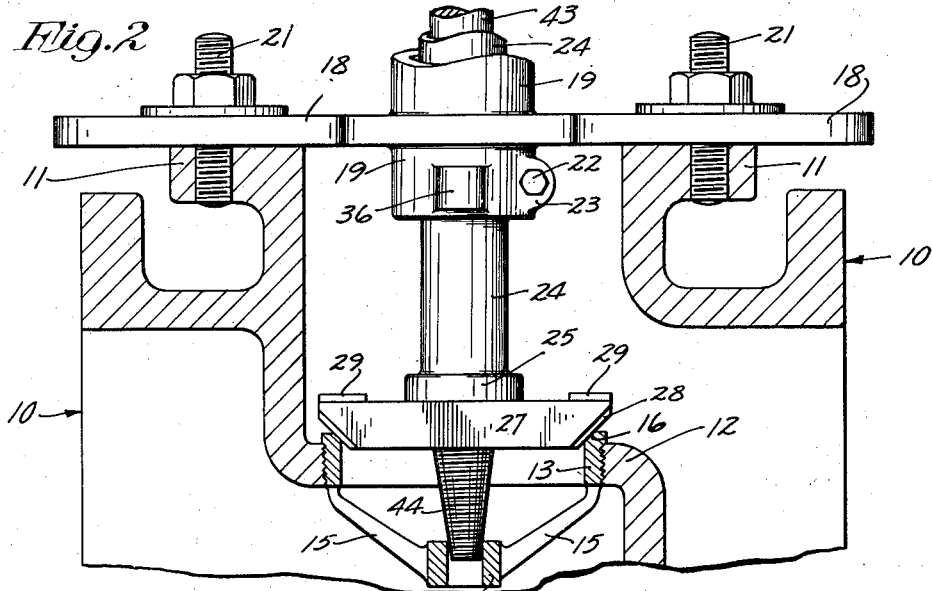
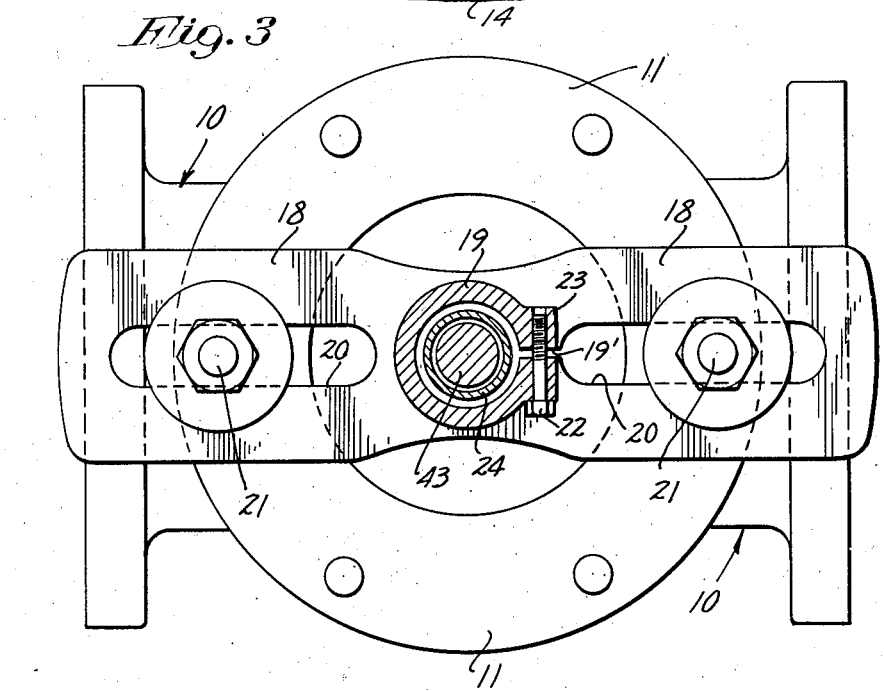

2,273,683

UNITED STATES PATENT OFFICE 2,273,683

VALVE SEAT REFACING TOOL

William Aab, New Ulm, Minn., assignor to New Ulm Manufacturing Company, New Ulm, Minn., a corporation of Minnesota Application August 26, 1940, Serial No. 354,156

10 Claims. (Cl. 90—12.5)

My present invention provides an extremely simple and highly efficient valve seat refacing tool and, generally stated, consists of the novel devices, combinations of devices, and arrangement of parts hereinafter described and defined in the claims.

The objects of the invention are simplicity of construction; accuracy in the operation of the tool; reliability and dependability of operation; convenience and ease of application and manipulation; and durability of the mechanism of the device.

The improved tool has been especially designed and is particularly well adapted for application to castings or casings, but is capable of more extensive use.

The chief elements of the improved tool are an anchoring bracket with sleeve-like bearing hub; a reversible cutterhead for refacing flat or beveled valve seats; a cutterhead tool or sleeve mounted in said bearing hub for rotary and axial movements; a centering stem extending through said cutterhead tube for axial movements therein and around which said cutterhead tube is capable of rotation; means for imparting feeding movements to said cutterhead tube; and means for rotating said cutterhead tube and cuttterhead carried thereby.

These elements are combined in a novel way and by novel means which are illustrated in the accompanying drawings and are described in the specification and defined in the claims.

In the accompanying drawings, which illustrate the invention, like characters indicate like parts throughout the several views.

Referring to the drawings:

Fig. 1 is a view, chiefly in elevation, but with some parts in section, showing the tool applied to reface the valve seat of a valve structure of the "globe valve" type;

Fig. 2 is a fragmentary view in section, on the same line as Fig. 1, but showing the cutterhead reversed from the position shown in Fig. 1 so as to reface a beveled or conical valve seat, whereas in Fig. 1, the cutterhead is shown as set to reface the flat annular surface of the valve seat;

Fig. 3 is a section taken on the line 3—3 of Fig. 1;

Fig. 4 is a section taken on the line 4—4 of Fig. 1, most of the parts below said line being omitted;

Fig. 5 is a section taken on the line 5—5 of Fig. 1;

Fig. 6 is a vertical section taken on the line 6—6 of Fig. 1, some parts being broken away; and Fig. 7 is a view in perspective showing the cutterhead removed from the tool.

A casting or casing of the "globe valve" is indicated by the numeral 10, the same having the customary cover flange 11 and partition flange 12, in which latter the conventional or similar annular valve seat 13 is applied by threaded engagement. Usually the valve seat 13 will have an axially offset valve stem guiding hub 14 connected thereto by spider arms 15. These valve seats are the elements that require frequent refacing. Usually these annular valve seats have beveled or conical valve surfaces 16 and flat annular surfaces 17, and frequently it is desirable to reface or dress both of these surfaces. However, in some instances the valve seats have only beveled or conical valve surfaces which will require refacing and sometimes such valve seats have only the flat annular surfaces that require refacing. It may be here stated in advance that this improved tool is designed to accomplish all of the above noted or similar desired refacings.

The above noted anchoring bracket of the device, as preferably designed, involves a substantially straight flat anchoring bar 18 and an upright sleeve-like bearing hub 19 that is preferably cast integral with said bar and is located at the center or intermediate portion thereof. The projecting ends of the bar 18 are formed with long diametrically opposite slots 20 that are adapted to be adjustably but rigidly secured to the cover flange 11 by means of nut-equipped stud bolts 21 applied as clearly shown in Figs. 1 and 3. The sleeve-like bearing hub 19, at one side, is formed with a longitudinal slit 19' that extends from end to end thereof and opens into one of the slots 20. By means of machine screws 22 applied through lugs 23 on the upper and lower portions of the hub 19, said hub 19 is made slightly expansible and contractible. It is here important to note that the slots 20 are long and that one thereof forms an extension of the slit 19' and therefore affords a slight resilience required for the expansive adjustment of said hub.

Also it will be noted, by reference particularly to Fig. 1, that the hub 19 projects from the bar 18 in one direction much farther than it does in the opposite direction. The purpose of this will presently appear.

Mounted to freely rotate within the hub 19, and extending therethrough with freedom for axial adjustments therein, is a tubular cutter-carrying shaft 24 herein designated as the cutterhead tube. At its lower end the tube 24 is provided with an outstanding annular stop flange 25 and below said flange with a threaded portion 26.

The cutterhead or cutting tool proper is preferably made in the form of a substantially flat tempered steel bar 27 threaded at its central portion for engagement on the threaded end 26 of the cutter tube. For the performance of the different kinds of work above indicated and hereinafter more fully described, this cutterhead 27 is formed at both ends with beveled cutting teeth 28 and with plane cutting teeth 29. The teeth 28 are on one side and the teeth 29 on the other side of said cutterhead. The teeth 28 are, of course, adapted to cut or reface the beveled valve surfaces 16 while the teeth 29 are in a common plane and are adapted to cut or reface valve surfaces 17. Obviously, the cutterhead 27 is readily reversible so as to render, at will, either the teeth 28 or the teeth 29 operative.

In this improved tool the cutter tube 24 and cutterhead 27 are adapted to be manually rotated; and as a simple means for accomplishing this, said stem, at its extreme upper end, is milled at 30 for the detachable application of an operating bar 31, indicated by dotted lines in Fig. 1.

Means is provided for producing a sort of micrometer feed movement to the cutter tube and cutterhead; and this is accomplished by simple means best illustrated in Figs. 1, 5 and 6. The tube 24, a short distance above the hub 19, is provided with a rigidly secured collar 32 formed with an annular groove 33. This collar 32 is made rigid but vertically adjustable by means of a set-screw 34, shown in Fig. 6.

The bearing hub 19 is provided with upper and lower internally threaded offset lugs 35 and 36 into either of which a feed-screw 37 is adapted to be screwed. This screw 37 has a knurled head 38 and above said head has an annular groove 39. In the adjustment shown in Figs. 1 and 6, the screw 37 is engaged with the lug 35.

As a connection between the feed screw and the collar 32, there is a shipper plate or flat member 40 provided with a wide and large fork-forming notch 41, at one end, and with a narrower and smaller fork-forming notch 42 at its other end. The prongs formed by the notch 41 work in the annular groove 33 of the collar 32, while the prongs formed by the notch 42 work in the annular groove 39 of feed-screw 37.

Extended axially through the cutter tube 24, with freedom for both rotary and axial movements therein, is a centering stem 43 which, at its lower end, is provided with a tapered and preferably very finely threaded portion or end 44. At its extreme upper end, well above the upper end of the cutter tube 24 and bar 31, this centering stem 43 is provided with a detachable pin-like hand-piece or bar 45. In the particular structure illustrated, pin 45 is endwise insertable through perforations in the recessed upper end of stem 43 and is provided with the spring-pressed latch ball 46 to prevent accidental displacement thereof.

*Instructions for the use of the above described tool*

If the flat upper face of a valve seat is to be refaced or dressed, the cutterhead 27 will be applied as best shown in Fig. 1, but if the beveled valve surface is to be refaced or dressed, then the cutterhead should be applied as shown in Fig. 2. When the cutterhead is applied for the purpose stated, the complete tool will be placed on the flange 11 substantially in position but with the bar still loosely held by the nut-equipped stud bolts 21. Then push the centering stem 43 down causing its tapered end 44 to enter the hole of spider hub 14. The conical threaded lower end of the centering stem fits various sides of the spider holes and some holes are very near the valve seat and some are two inches or more below the seat. This variation of position is taken care of by sliding the centering stem which can be completely telescoped into the cutterhead hole.

While pushing the tapered threaded end of the centering stem into the spider hole, also press the bracket down on the flange of the valve casing. When the bracket is level on the valve flange center the centering stem lightly. After this is completed, fasten the bracket to the valve flange so that it will not shift. Tighten the nuts of the anchoring bolts a little at a time and do not make one nut tighter than the other. Then tighten the centering stem with the small handle located near the top end thereof.

The collar 32 on cutter tube 24 should be adjusted so that the operative teeth of the cutter bar 27 are positioned approximately for cutting action and then lock said collar 32 to tube 24 by the set-screw 34.

The cutterhead may be readily hand rotated by the wrench-acting bar 31. The advance cutting action of the cutterhead, in the refacing action, can be accomplished with a feed action that is like a micrometer in accuracy, simply by turning the feed-screw 37 in the proper direction. Of course, a reverse rotation of the feed-screw will retract the cutting tool.

For valves that have the spider-like supporting hub below the valve seat, the device is applied and used as above described. However, some valves do not have these hubs below the valve seats and for these the centering stem will not be used but the cutter and its supporting tube will be properly positioned and guided by the bracket.

For small sized valves the short hub will be extended downward from the bar, but for very large or deep valve casings or castings, the bar 18 will be turned with its long hub portion downward; and this, of course, will require removal of the cutter tube 24 and the reapplication thereof in the inverted hub 19. When the device is thus inverted, the adjusting screw 37 will be applied in the then upturned lug 36, instead of in the lug 35. In both cases the feeding operation above described will be the same.

The improved tool described has been put into actual use and has proven to be highly satisfactory for all of the purposes of a tool of the above character.

What I claim is:

1. In a tool of the kind described, anchoring means having a sleeve-like hub, a tubular shaft mounted in said hub for independent rotary and axial movements, a cutterhead applied to the lower end of said tubular shaft, a centering stem extended through said tubular shaft and mounted for independent axial movements therein, and feed means interconnected between said hub and tubular shaft permitting free rotation of the latter and adjustable to produce a feed movement of said tubular shaft and cutterhead.

2. The structure defined in claim 1 in which said bracket includes a reversible anchoring bar, said hub having relatively long and relatively short hub portions on opposite faces of said anchoring bar, said feed means being applicable, at will, either to the long or short projecting portions of said hub, and said tubular shaft being insertable through said hub in both positions of said anchoring bar and its hub.

3. The structure defined in claim 1 in which the centering stem is provided with a conical end.

4. The structure defined in claim 1 in which said centering stem is provided with a threaded conical lower end.

5. The structure defined in claim 1 in which said feed means includes a collar on said shaft provided with an annular groove, a feed-screw having threaded engagement with said hub, said screw having means for rotating the same and provided at its extended end with an annular groove, and a shipper plate forked at one end for engagement with the groove of said collar and forked at its other end for engagement with the groove of said feed-screw.

6. In a tool of the kind described, anchoring means having a sleeve-like hub, a cutter shaft mounted in said hub for rotary and axial movements, a cutterhead applied to the lower end of said shaft, means for rotating said shaft, and feed means for axially adjusting said shaft while permitting rotation thereof, said feed means includes a collar on said shaft provided with an annular groove, a feed-screw having threaded engagement with said hub, said screw having means for rotating the same and provided at its extended end with an annular groove, and a shipper plate forked at one end for engagement with the groove of said collar and forked at its other end for engagement with the groove of said feed-screw.

7. In a tool of the kind described, a relatively fixed sleeve-like hub, a cutter shaft mounted in said hub for independent rotary and axial movements, a cutterhead applied to the lower end of said shaft, means for rotating said shaft independent of its axial movements, a collar fixed to said shaft but capable of axial adjustments thereon, and feed means for axially adjusting the said shaft while permitting rotation thereof, including a feed-screw having threaded engagement with a part of said hub, and a shipper plate subject to the adjustments of said feed-screw and operative on said collar to move the same axially while permitting free rotation of said collar and shaft.

8. The structure defined in claim 7 in which said cutter shaft is tubular, and in further combination with a centering stem mounted for free axial movements through said tubular shaft and having a conical lower end for the purpose described.

9. In a tool of the kind described, a relatively fixed hub, a tubular shaft mounted in said hub for independent rotary and axial movements, a cutterhead applied to the lower end of said tubular shaft, a centering stem extended through said tubular shaft and mounted therein for free axial movements, means for rotating said shaft in said hub, and means for producing axial feed movements of said tubular shaft and cutterhead independently of its rotary movements.

10. The structure defined in claim 9 in which said centering stem is provided with a tapered lower end.

WILLIAM AAB.